(12) United States Patent
Scheibler et al.

(10) Patent No.: US 9,705,623 B2
(45) Date of Patent: Jul. 11, 2017

(54) METHOD FOR DETERMINING THE WALSH-HADAMARD TRANSFORM OF N SAMPLES OF A SIGNAL AND APPARATUS FOR PERFORMING THE SAME

(71) Applicant: Ecole Polytechnique Federale de Lausanne (EPFL), Lausanne (CH)

(72) Inventors: Robin Scheibler, Lausanne (CH); Saeid Haghighatshoar, St-Sulpice Vd (CH); Martin Vetterli, Grandvaux (CH)

(73) Assignee: Ecole Polytechnique Federale de Lausanne (EPFL) (CH)

( * ) Notice: Subject to any disclaimer, the term of this patent is extended or adjusted under 35 U.S.C. 154(b) by 52 days.

(21) Appl. No.: 14/046,497

(22) Filed: Oct. 4, 2013

(65) Prior Publication Data

US 2015/0098313 A1     Apr. 9, 2015

(51) Int. Cl.
  *H04J 13/00* (2011.01)
  *G06F 17/14* (2006.01)

(52) U.S. Cl.
  CPC ........ *H04J 13/0048* (2013.01); *G06F 17/145* (2013.01)

(58) Field of Classification Search
  CPC ........................... H04J 13/0048; G06F 17/145
  USPC ....................................................... 370/209
  See application file for complete search history.

(56) References Cited

U.S. PATENT DOCUMENTS 8,515,964 B2 *  8/2013  Ravikumar ....... G06F 17/30628
                                        707/661

OTHER PUBLICATIONS

Abstract Idea Examples, Jan. 2015, USPTO, Interim Eligibility Guidance, pp. 1-20.*

(Continued)

*Primary Examiner* — Melvin Marcelo
(74) *Attorney, Agent, or Firm* — Blank Rome LLP

(57) ABSTRACT

A computer-implemented method for determining the Walsh-Hadamard transform of N samples of a signal, comprises electing a plurality of hashing C matrices $\Sigma_1, \ldots \Sigma_C$, computing C hashes of a particular length based at least on a hashing front end and the plurality of matrices $\Sigma_1, \ldots \Sigma_C$, forming a bipartite graph with a plurality of variable nodes and a plurality of check nodes, the variable nodes being non-zero coefficients to recover, and the check nodes being hashed samples, finding an isolated check node and recovering non-zero coefficients connected to the isolated check node by employing collision detection and support estimation of the signal, peeling from the bipartite graph the recovered non-zero coefficients, and repeating the computing step, forming step, finding step and peeling step until all the nodes in the plurality of check nodes are zero.

13 Claims, 5 Drawing Sheets

(56) References Cited

OTHER PUBLICATIONS

R. Scheibler et al., "A Fast Hadamard Transform for Signals with Sub-linear Sparsity," Oct. 7, 2013, 16 pages.
R. Scheibler et al., "A Fast Hadamard Transform for Signals with Sub-linear Sparsity," Oct. 7, 2013, 8 pages.
"What are Walsh Codes and How is it Implemented in CDMA Systems?", https://www.quora.com/What-are-walsh-codes-and-how-is-it-implemented-in-CDMA-systems, 3 pages; printed Feb. 14, 2017.
"Code Division Multiple Access", Wikipedia, https://en.wikipedia.org/wiki/Code_division_multiple_access; 8 pages; printed Feb. 14, 2017.

* cited by examiner

1

METHOD FOR DETERMINING THE WALSH-HADAMARD TRANSFORM OF N SAMPLES OF A SIGNAL AND APPARATUS FOR PERFORMING THE SAME

FIELD OF INVENTION

The present invention is directed to a method for determining the Walsh-Hadamard transform of N samples of a signal and to the means for performing the same. More specifically the present invention proposes a computer-implemented method for determining the Walsh-Hadamard transform of N samples of a signal, a system, an apparatus and a computer program product capable of performing said computer-implemented method for determining the Walsh-Hadamard transform of N samples of a signal.

BACKGROUND OF INVENTION

The discrete Walsh-Hadamard transform (WHT) is a known signal processing tool with applications in areas as disparate as image compression, multi-user transmission cellular networks (CDMA), coding, and spectroscopy. The discrete Walsh-Hadamard transform has a recursive structure which, similar to the fast Fourier transform (FFT) algorithm for computing the discrete Fourier transform (DFT) of the signal, allows a fast computation with complexity $O(N \log N)$ in the dimension of the signal N.

A number of publications have addressed the particular problem of computing the DFT of an N dimensional signal with time complexity sub-linear in N, assuming that the signal is K-sparse in the frequency domain. Being sublinear in N, all the methods proposed in said publications improve over the time complexity $O(N \log N)$ of the FFT. Such algorithms are generally called sparse FFT (sFFT) algorithms. In particular, a very low complexity algorithm for computing the 2D-DFT of a $\sqrt{N} \times \sqrt{N}$ signal has become available.

In a similar line of work, based on the sub-sampling property of the DFT in the time domain, resulting in the aliasing in the frequency domain, a novel low complexity iterative algorithm was developed in the art by borrowing ideas from the coding theory to recover the non-zero frequency components.

Upon reviewing the knowledge available in the art summarized above it has become apparent for the inventors of the present invention that further needs exist in the art insofar developing further some of the useful properties of the discrete Walsh-Hadamard transform, especially the sub-sampling property. It was further evident that a need exists to show that the subsampling in the time domain allows to induce a controlled aliasing pattern over the transform domain in components, namely, instead of obtaining the individual components in the transform domain, it is possible to obtain the linear combination of a controlled collection of components (aliasing), which creates interference between the non-zero components if more than two of them are involved in the induced linear combination.

SUMMARY OF THE INVENTION

The present invention proposes in accordance with one of its embodiments a computer-implemented method for determining the Walsh-Hadamard transform of N samples of a signal, comprising electing a plurality of hashing C matrices $\Sigma_1, \ldots \Sigma_C$, computing C hashes of a particular length based at least on a hashing front end and the plurality of matrices $\Sigma_1, \ldots \Sigma_C$, forming a bipartite graph with a plurality of variable nodes and a plurality of check nodes, wherein the variable nodes are non-zero coefficients to recover, and said check nodes are hashed samples, finding an isolated check node and recovering non-zero coefficients connected to the isolated check node by employing collision detection and support estimation of the signal, peeling from the bipartite graph the recovered non-zero coefficients, and repeating the computing step, forming step, finding step and peeling step until all the nodes in the plurality of check nodes are zero.

In accordance with another embodiment of the present invention is proposed a system for performing a determination of a Walsh-Hadamard transform of N samples of a signal, including a plurality of modules, each module comprising a computer readable medium having thereon computer executable instructions for electing a plurality of hashing C matrices $\Sigma_1, \ldots \Sigma_C$, computing C hashes of a particular length based at least on a hashing front end and the plurality of matrices $\Sigma_1, \ldots \Sigma_C$, forming a bipartite graph with a plurality of variable nodes and a plurality of check nodes, wherein the variable nodes are non-zero coefficients to recover, and the check nodes are hashed samples, finding an isolated check node and recovering non-zero coefficients connected to the isolated check node by employing collision detection and support estimation of the signal, peeling from the bipartite graph the recovered non-zero coefficients, and repeating the computing step, forming step, finding step and peeling step until all the nodes in the plurality of check nodes are zero.

In accordance with yet another embodiment of the present invention is proposed a computer readable storage medium having recorded thereon a computer program for determining a Walsh-Hadamard transform of N samples of a signal, the computer program comprising an algorithm capable of electing a plurality of hashing C matrices $\Sigma_1, \ldots \Sigma_C$, computing C hashes of a particular length based at least on a hashing front end and said plurality of matrices $\Sigma_1, \ldots \Sigma_C$, forming a bipartite graph with a plurality of variable nodes and a plurality of check nodes, wherein said variable nodes are non-zero coefficients to recover, and said check nodes are hashed samples, finding an isolated check node and recovering non-zero coefficients connected to said isolated check node by employing collision detection and support estimation of said signal, peeling from said bipartite graph the recovered non-zero coefficients, and repeating said computing step, forming step, finding step and peeling step until all the nodes in said plurality of check nodes are zero.

These and other aspects of the invention are reflected in the attached independent claims. Other further embodiments of the present invention are proposed in accordance with the attached dependent claims.

BRIEF DESCRIPTION OF DRAWINGS

Further objects and advantages of the invention will be appreciated from the following description, taken in conjunction with the included drawings, of which.

DETAILED DESCRIPTION OF THE INVENTION

Figure 1:
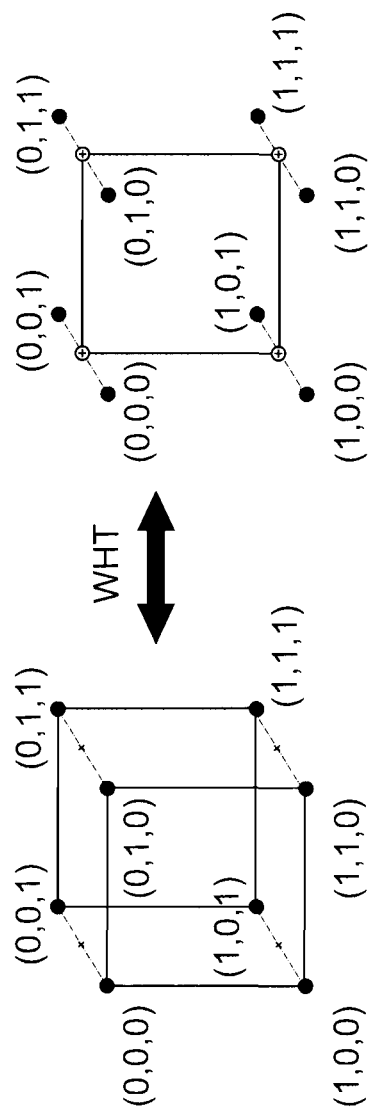
FIG. 1 is an illustration of the down-sampling property of the hypercube.

The following description of the presently contemplated best mode of practicing the invention is not to be taken in a limiting sense, but is made merely for the purpose of describing the general principles of the invention. The scope of the invention should be determined with reference to the claims.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium/media (i.e., data storage medium/media) having computer readable program code recorded thereon.

Any combination of one or more computer readable medium/media may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium, i.e., data storage medium, may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the likes and conventional procedural programming languages, such as the "C" programming language or similar programming languages. The program code may be executed entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

As previously mentioned, the present invention develops particular useful properties of the Walsh-Hadamard, especially the subsampling property. It will be further shown that the subsampling in the time domain allows to induce a controlled aliasing pattern over the transform domain components, namely, instead of obtaining the individual components in the transform domain, it is possible to obtain the linear combination of a controlled collection of components (aliasing), which creates interference between the nonzero components if more than two of them are involved in the induced linear combination. The present invention considers the transform domain components as variable nodes and give a check node interpretation for the induced linear combination. Moreover, assuming a random support model for the nonzero coefficients in the transform domain, the present invention proposes an iterative peeling decoder to recover the nonzero components. The proposed sparse fast Hadamard transform (SparseFHT) is the combination of the linear hashing and the iterative peeling decoder. It recovers the exactly K-sparse Hadamard spectrum with high probability in $O(K \log_2 K \log_2 N/K)$.

With view to the above, among others, in the following, the properties of the WHT will be reviewed and the notations employed in the rest of this document will be elucidated. A subsequent section is devoted to developing a linear hashing operator and some of its properties, particularly those useful for collision detection and support recovery. In another subsequent section, the recovery algorithm will be described. Simulation results are presented in a further subsequent section.

Throughout the following description, by [N] is denoted the set of all integers $\{0, 1, \ldots, N-1\}$.

If x is a vector of size $N=2^n$ for some $n \in \mathbb{N}$. For $i \in [N]$, the i-th component of x, $x_i$, is denoted by $x_{m_0, m_1, \ldots, m_{n-1}}$ where $m_0, m_1, \ldots, m_{n-1}$ is the binary expansion of i with $m_0$ being the least significant bit. The WHT of size $N=2^n$ of x is defined as follows:

$$X_{k_0,\ldots,k_{n-1}} = \sum_{m_0=0}^{1} \cdots \sum_{m_{n-1}=0}^{1} (-1)^{k_0 m_0 + \ldots + k_{n-1} m_{n-1}} x_{m_0,\ldots,m_{n-1}}.$$

where $[k_0, \ldots, k_{n-1}]^T \in F_2^n$ is the corresponding binary indexing of the transform domain component and where $F_2^n = \{0,1\}^n$ denotes the set of all binary vectors of dimension n. To simplify the notation, from now in this document all indices are considered to be elements of $F_2^n$. The inner products of two vectors in $F_2^n$ is defined as $$\langle k, m \rangle = k^T m = \sum_{i=0}^{n-1} k_i m_i$$

where additions and multiplications are modulo two.

Although $\langle k, m \rangle$ it is not really an inner product in exact mathematical sense because, for example, since it does not satisfy the positively property, namely, for every $k \in F_2^n$ with even number of ones, $\langle k,k \rangle = 0$. However, in this document, the name of inner product will be used in the following, for simplicity. While employing this notation, it is possible to write the WHT in the following compact form $$X_k = \sum_{m \in F_2^n} (-1)^{\langle k,m \rangle} x_m, k \in F_2^n.$$

In the following, while borrowing terminology from the discrete Fourier transform, by x is denominated the time domain signal with corresponding time samples $x_i$. Similarly, by transform domain samples are called Xk frequency or spectral components.

For a signal $x \in R^N$ the support of x is defined as sup $p(x) = \{i \in [N] : x_i \neq 0\}$. The signal x is called K-sparse if |sup $p(x)$|=K, where for a set $A \subset |N|$, wherein |A| denotes the cardinality or the number of elements of A. For a set of N dimensional signals $S_N \subset R^N$ the sparsity of the set is defined as $K_N = \max_{x \in S_N} |\sup p(x)|$.

A class of signals of increasing dimension $\{S_N\}_{N=1}^\infty$ has sublinear sparsity if there is $0 < \alpha < 1$ and some $N_0 \in \mathbb{N} \ldots$ such that for all $N \rangle N_0$, $K_N \leq N^\alpha$. The value $\alpha$ is called the sparsity power of the class.

In the following the signals are divided into two parts: very sparse and less sparse regime. Different constructions and distinct analysis methods will be applied for these two cases. Depending on the sparsity level of the signal, the application of this distinction and of distinct analysis methods are required in order to keep the computational complexity low, at the desired level.

For the case of the Very Sparse Regime:
Let $0 < \alpha < 1/3$, $N=2^n$ a power of two and $K=N^\alpha$.
Let $x \in R^N$ be a K-sparse signal in a class of signals with sparsity power $\alpha$ whose support is uniformly randomly selected among all possible $$O\left(K\log_2(K)\log_2\left(\frac{N}{K}\right)\right)$$

subsets of [N] of size K. There is an algorithm that can compute the WHT of x with a computational complexity $$\binom{N}{K}$$

with a probability at least $$1 - O\left(1/K^{3(\lfloor\frac{1}{\alpha}\rfloor/2-1)}\right),$$

where for $u \in R_+$, $[u]=\max \{n \in Z : n \leq u\}$ and where the probability is taken over all possible supports. For the very sparse regime the failure probability in terms of N, for every value of $$O(N^{-\frac{3}{8}}).$$

can be upper bounded by $$\alpha \in \left(0, \frac{1}{3}\right)$$

For the case of the Less Sparse Regime: Let $1/3 \leq \alpha < 1$, $N=2^n$ a power of two and $K=N^\alpha$. Let $x \in R^N$ be a K-sparse signal in a class of signals with sparsity power $\alpha$ with a random support. There is an algorithm that can compute the WHT of x with a computational complexity of $$O\left(K\log_2(K)\log_2\left(\frac{N}{K}\right)\right).$$

In the following a few properties of the WHT are reviewed, such as the 'Downsampling/Aliasing' property. Effectively, this property allows to hash the spectral components to some bins which creates an aliasing pattern in the spectral domain. The frequency domain aliasing is important for constructing a code bipartite graph and developing the iterative peeling algorithm over this graph to recover the spectral components.

A property of the WHT concerns Shift/Modulation. Let $p \in F_2^n$. If $X_k$ is the WHT of $x_m$, then $$x_{m+p} \xleftrightarrow{WHT} X_k(-1)^{\langle p,k \rangle}$$

where m+p is the component-wise addition of m and p in $F_2$, with the i-th component being $m_i+p_i$ mod 2.

Another property of the WHT allows to partially permute the Hadamard spectrum in a specific way by applying a corresponding permutation in the time domain. However, the collection of all possible permutations of this kind is limited and in the following we aim to give a full characterization of all those permutations. Technically, this property is equivalent to finding permutations $$\pi_1, \pi_2 : [N] \stackrel{1-1}{\longrightarrow} [N]$$

with corresponding permutation matrices $$\Pi_1, \Pi_2 \text{ such that } \Pi_2 H_N = H_N \Pi_1 \quad (1)$$

where $H_N$ is the Hadamard matrix of order N. The permutation matrices are constructed from the permutations as $(\Pi)_{i,j}=1$ if and only if $\pi(i)=j$, and zero otherwise. In other words, the aim is to find all of the possible permutations of the rows of the Hadamard matrix $H_N$ such that the resulting N×N matrix can be equivalently obtained by a permutation of the columns of $H_N$.

All of the permutations satisfying equation (1) are described by the elements of $GL(n,F_2) = \{A \in F_2^{n \times n} | A^{-1} \text{ exists}\}$, where n×n is the set of non-singular matrices with entries in F2. The total number of possible permutations possible in accordance with formula (1) is $\Pi_{i=0}^{n-1}(N-2^i)$ which is a negligible fraction of all N! permutation over [N].

Another property of the WHT concerns Permutation. Let $\Sigma \in GL(n,F2)$ and $k,m \in F_2^n$. If $X_k$ is the WHT of $x_m$, then $$x_{\Sigma m} \stackrel{WHT}{\longleftrightarrow} X_{\Sigma^{-T}k}.$$

Any of $\Sigma \in GL(n, F_2)$ is a bijection from $F_2^n$ to $F_2^n$, thus $x_{\Sigma m}$ is simply a vector obtained by permuting the initial vector $x_m$.

Yet another property of the WHT is that of downsampling/aliasing. For a vector x of dimension $N=2^n$, said vector is indexed by a binary vector of length n, namely, $x_{m_0,m_1,\ldots,m_{n-1}}$. To subsample this vector in dimension i, the i-th component of the index is frozen to 0 or 1. For example, $x_{m_0,m_1,\ldots,m_{n-1}}$ is a $2^{n-1}$ dimensional vector obtained by subsampling the vector $x_m$ along the first index.

Downsampling/Aliasing: Suppose that x is a vector of dimension $N=2^n$ for some $n \in N$ indexed by $m \in F_2^n$ and assume that $B=2^b$, where $b \in N$ and $b<n$.

Let $\Psi_b = [0_{b \times (n-b)} I_b]^T$ (2)

be the subsampling matrix freezing the first n-b components in the index m to 0. If $X_k$ is the WHT of $x_m$, then $$x_{\Psi_b m} \stackrel{WHT}{\longleftrightarrow} \sqrt{\frac{B}{N}} \sum_{i \in N(\Psi_b^T)} X_{\Psi_b k+i}.$$

The group $F_2^n$ can be visualized as the vertices of the n-dimensional hypercube. The downsampling property just explained implies that downsampling along some of the dimensions in the time domain is equivalent to summing up all of the spectral components along the same dimensions in the spectral domain. This is illustrated visually in FIG. 1 for dimension n=3.

Referring now to FIG. 1, FIG. 1 is an illustration of the downsampling property on the hypercube. In FIG. 1 is shown an example for the case N=8. When the signal is subsampled by freezing one of the bits in the binary expansion of the indices of the signal vector, the indices along the same dimension of the hypercube are summed up in the Hadamard domain.

Figure 2:
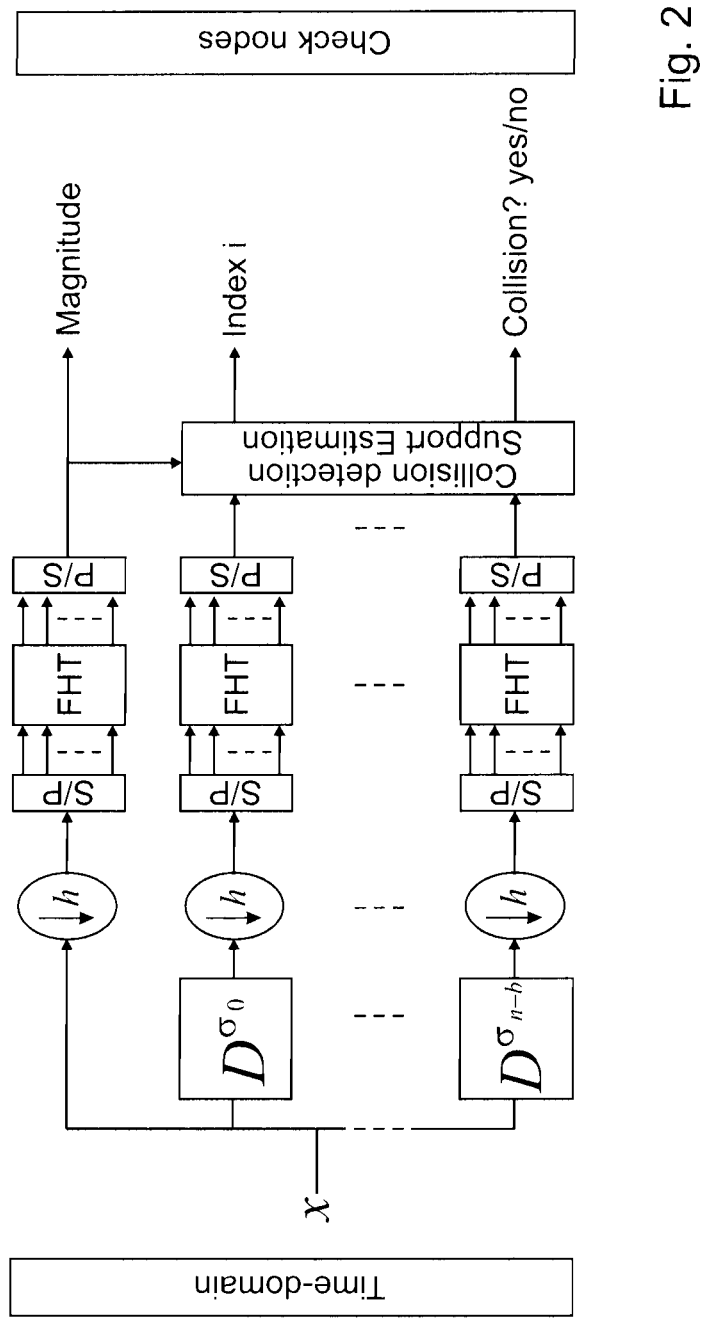
FIG. 2 is a block diagram of the processing of time-domain samples into check nodes of the sparse bipartite graph.

FIG. 2 is a block diagram of the processing of time-domain samples into check nodes of the sparse bipartite graph. Referring now to the representation provided in FIG. 2, it may be shown the input signal x is subsampled using the hashing matrix h. Subsequently, the same signal is first shifted by $\sigma_0$, as described above, before being subsampled by the same hashing matrix h. This is repeated for $\sigma_0, \ldots, \sigma_{n-b-1}$. The subsampled signals obtained on the n-b+1 branches are individually transformed using a length B Hadamard transform. The output of the n-b+1 transforms are fed into the support estimator/collision detector. The output from the uppermost branch together with the output of the support estimator/collision detector form the B check nodes corresponding to hash h.

In a general downsampling procedure, the frozen indices may be replaced by an arbitrary but fixed binary pattern. The only difference is that instead of summing the aliased spectral components, what needs to be taken into account are the suitable $\{+,-\}$ sign patterns, namely $$x_{\Psi_b m} \stackrel{WHT}{\longleftrightarrow} \sqrt{\frac{B}{N}} \sum_{i \in N(\Psi_b^T)} (-1)^{\langle p,i \rangle} X_{\Psi_b k+i} \quad (3)$$

where p is a binary pattern with the b zeros at the end. It is seen from equation (3) that the spectral components that are summed up do not change, but only the sign pattern for these components changes. Although subsampling with different values of p might help in the recovery process to extract the nonzero spectral components, for example when a set of linear equations are solved to find these nonzero values, but as it will be discussed later in this document, it can not improve the performance of the peeling decoder that we will be shown in use. Therefore, for simplicity, only the subsampling with all zero pattern p in the sequel will be used.

By applying the basic properties of the WHT, a hashing algorithm is proposed in the spectral domain. Assuming that $\Sigma \in GL(n,F_2)$ and $p \in F_2^n$, let $b \in N$, $B=2^b$ and let $m,k \in F_2^b$ denote the time and frequency indices of a B dimensional vector $$u_{\Sigma,p}(m) = \sqrt{\frac{N}{B}} x_{\Sigma \Psi_b m + p}$$

Indexed by $m \in F_2^b$ where $N=2^n$. Then, the length B Hadamard transform of $u_{\Sigma,p}$ is given by $$U_{\Sigma,p}(k) = \sum_{i|h_\Sigma(i)=k} X_i (-1)^{\langle p,i \rangle}$$

Where $h_\Sigma$ is the index hashing function defined by $$h_\Sigma(i) = \Psi_b^T \Sigma^{-T} i$$

Where $\Psi_b$ is as proposed in equation (2). Proof regarding the above is obtained based on the equations 1, 2, and 3.

Therefore, based on the above, an Algorithm 1 is provided which computes the hashed Hadamard spectrum. Given an FFT-like fast Hadamard transform (FHT) algorithm, and picking B bins for hashing the spectrum, Algorithm 1 requires O(B log B) operations.

Algorithm 1 that consists of FastHadamardHashing (x, N, $\Sigma$, p, B) may be summarized as follows:
Require: Signal x of length N, randomized parameters $\Sigma$ and p and given number of bins B.
Ensure: U contains the hashed Hadamard spectrum of x.

$$u_m = x_{\Sigma \Psi_b m + p} \text{ for } m \in F_2^b.$$

$$U = \sqrt{\frac{N}{B}} \text{ FastHadamard}(u_m, B).$$

In the following those properties of the hashing algorithm will be reviewed that are important for the development of an iterative peeling decoding algorithm. Said algorithm allows both to identify collision between the nonzero spectral coefficients that are hashed to the same bin and also to estimate the support of noncolliding components. More precisely, $U_{\Sigma,p}(k)$ is considered for two cases, p=0 and p≠0. Then it is easy to see that in the former case $U_{\Sigma,p}(k)$ is obtained by summing all of the spectral components with indices satisfying $h_\Sigma(i)=k$ whereas in the latter case the same components are added together weighted by $(-1)^{\langle p,i \rangle}$.

The following ratio test is defined as follows:

$$\tau_{\Sigma,p}(k) = \frac{U_{\Sigma,p}(k)}{U_{\Sigma,o}(k)}$$

When the sum in $U_{\Sigma,p}(k)$ contains only one non-zero component, it may be seen that $\tau_{\Sigma,p}(k)=1$ for any value of p. However, if there is more than one component in the sum, under a very mild assumption on the distribution of the nonzero coefficients of the spectrum (i.e. they are generated by a continuous distribution), it can shown that $\tau_{\Sigma,p}(k) \neq 1$ for at least some values of p. In fact, n-b well-chosen values of p allow to detect whether there is only one, or more than one non-zero components in the sum.

When there is only one $X_{i'} \neq 0$ such that $h_\Sigma(i')=k$, the result of the ratio test is precisely 1 or −1, and, in addition, reveals the value of the inner product between i' and p $$\langle p,i \rangle = 1_{\{\tau_{\Sigma,p}(k)<0\}} \quad (5)$$

where $1_{\{t<0\}}=1$ if t<0, and zero otherwise. Hence, if for n−b well-chosen values of p, the ratio test results in 1 or −1, implying that there is only one nonzero spectral coefficient in the corresponding bin, by some extra effort it is even possible to identify the support of the only non-zero component. This result is formalized in the following proposition which will be proved further in the document while discussing the proof of proposition 1, proposition 1 that is give in the following paragraph.

Regarding Collision detection/Support estimation in accordance with the present invention may be stated the following:
If $\Sigma \in GL(n, F_2)$ and $\sigma_i$, $i \in [n]$ denotes the columns of $\Sigma$, then we have:
1) If $\forall d \in [n-b]$, $|\tau_{\Sigma,\sigma_d}(k)|=1$ then almost surely there is only one coefficient in the bin indexed by k. Moreover, if we define $$\hat{v}_d = \begin{cases} 1_{\{\tau_{\Sigma,\sigma_d(k)}<0\}} & d \in [n-b], \\ 0 & \text{otherwise,} \end{cases}$$

the index of the unique nonzero coefficient is given by $$i = \Sigma^{-T}(\Psi_b k + \hat{v}). \quad (6)$$

2) If there exists a $d \in [n-b]$ such that $|\tau_{\Sigma,\sigma_d(k)}| \neq 1$ then the bin k contains more than one nonzero coefficient.

Figure 3:
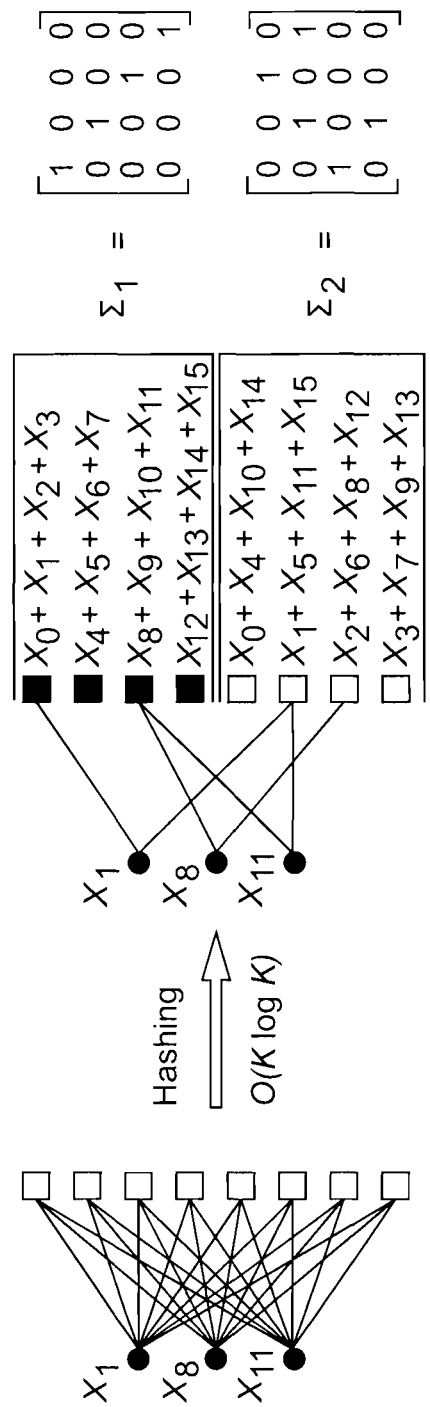
FIG. 3 represents an example of the bipartite created by through hashing for N=8, K=3 and C=2; The hashing matrices used $\Sigma_1, \Sigma_2$ are given on the right.

In the following a brief overview of the Sparse Fast Hadamard Transform (SPFHT) is provided. In particular, the peeling decoder is explained which recovers the nonzero spectral components of the Sparse Fast Hadamard Transform and analyzes its computational complexity. Assuming for example the presence of an N dimensional signal x, where $N=2^n$, with WHT X, where X has only K nonzero components with $K=O(N^\alpha)$, for some $0<\alpha<1$, scaling sub-linear in N. As $H_N^{-1}=H_N$, taking the inner product of the vector X with the i-th row of the Hadamard matrix FIN, the time domain sample xi is obtained. Using terminology from the coding theory, it is possible to consider the spectral components X as variables nodes and the inner product of the i-th row of FIN is like a check node constraint on X. For example, the first row of the Hadamard matrix is the all-one vector which implies that the sum of all of the components of X must be equal to the first time domain sample. A similar interpretation holds for the other rows. Therefore, the recovery of the non-zero coefficients is considered a decoding problem. If the WHT is considered, it may be seen that the induced bipartite graph on the nonzero spectral values is a complete (dense) bipartite graph as depicted in the right part of FIG. 3. Specifically FIG. 3 represents an example of the bipartite created by through hashing for N=8, K=3 and C=2. The hashing matrices used $\Sigma_1$, $\Sigma_2$ are given on the right. As it will be explained in detail further in this document while referring to FIG. 3, FIG. 3 comprises on the left, a bipartite graph representation of the compressed sensing problem with N=8 and K=3. In the figure it may be observed how sparse the underline bipartite graph becomes after applying of the hashing operation with B=4, and C=2 produced by plugging $\Sigma_1$, and $\Sigma_2$ in equation (4). The variable nodes (●) are the non-zero coefficients to be recovered. The white check nodes (□) are the original time-domain samples. The other squares are new check nodes after application of Algorithm 1. Each group of four check nodes corresponds to a different permutation. In the new graph, every check node uses $$\log_2 \frac{N}{B} + 1$$

samples for collision detection and support estimation.

For codes on bipartite graphs, there is a collection of low complexity belief propagation algorithms to recover the variable node components given the check node constraints. Almost all of these algorithms work under the sparsity assumption on the underlying bipartite graph. Although the graph corresponding to WHT is dense, and probably not suitable for any of these belief propagation algorithms to work, by subsampling the time domain components of the signal it is possible to hash the spectral components in bins which allows to induce a sparse bipartite graph in the spectral domain as depicted in the left part of FIG. 3. As previously mentioned, FIG. 3 represents an example of the bipartite created by through hashing for N=8, K=3 and C=2. The hashing matrices used $\Sigma_1$, $\Sigma_2$ are given on the right.

The iterative peeling algorithm proposed in accordance with the present invention proceeds as follows: It first tests every check node until a degree one check node is identified. Such a check node is called a singleton. By using the proposition made above in connection with the collision detection/support estimation, steps 1 and 2 and the equation 6, the algorithm is able to find the position and the value of the corresponding nonzero component and to peel it off from all other check nodes. In particular, after this operation the corresponding singleton check node gets value zero, namely, it is satisfied. Such a check node is called a zeroton. If after a couple of iterations, all of the check nodes are zeroton, namely, all of them are satisfied, the algorithm has been able to identify all of the nonzero spectral components. However, if during the algorithm no singleton exists to be peeled off, namely, all of the check nodes have degree greater than 1, these check nodes are called multiton check nodes, and the algorithm fails to identify all the spectral coefficients. The efficiency of the proposed algorithm is measured by the probability of the success recovery. The more detailed pseudo-code of the proposed algorithm is given in Algorithm 2, that will be stated further in this document.

In accordance with the present invention, over the induced bipartite graph on the spectral components, an iterative peeling algorithm is run, iterative peeling algorithm that will be explained in detail further in this document. To do a complexity analysis of the peeling algorithm, let B be the number of bins used for hashing the spectral components of x, where $B=2^b$ for some $b \in N$ and let C be the number of different hashing schemes used where we assume that $C=\Theta(1)$. Notice that in the resulting bipartite graph representation, C is the degree of every variable node (nonzero spectral component). The algorithm is designed for the case $$\frac{K}{B} = \Theta(1).$$

Using what is known from above regarding hashing, the hashing operation has time complexity $O(B \log_2(B))$, which in this case is equivalent to $O(K \log_2(K))$. Moreover, using what we know from above regarding collision detection/support estimates, to identify the collided spectral components requires $$n - b = \log_2\left(\frac{N}{B}\right) = O\left(\log_2\left(\frac{N}{K}\right)\right)$$

extra hashes. Therefore, the complexity of creating the sparse graph is $O(K \log_2 K \log_2(N/K))$. The peeling algorithm runs in time linear in the number of variable nodes, but in the present case it needs an additional $\log_2 (N/B)$ operations to decode the support of isolated check nodes. As it will be shown in the following, running the peeling algorithm for a constant prefixed number of iterations is sufficient to recover the non-zero spectral values, thus the total time complexity of the algorithm is also of the order $O(K \log_2(K) \log_2(N/K))$ as asserted before.

In the following a very sparse regime is considered where $0 < \alpha \le \frac{1}{3}$. In this regime it is shown that while assuming a random support model for non-zero spectral components and with a careful design of hash functions, it is possible to obtain a random bipartite graph with variable nodes corresponding to non-zero spectral components and with check nodes corresponding to output of hash functions. It is proven that asymptotically this random graph is similar to an LDPC bipartite graph. Running the peeling decoder to recover the spectral components is also equivalent to belief propagation (BP) for binary erasure channel (BEC). Information is available in the art, in coding theory, about how to asymptotically evaluate the performance of the BP decoder. Specially, it is possible to show that the error (decoding failure) probability can be fully characterized by a 'Density Evolution' (DE) equation allowing a perfect analysis of the peeling decoder.

In the following the performance of the decoder is analyzed is a very sparse regime.
For this purpose:
1) a random bipartite graph with nonzero spectral components is constructed, with variable nodes and output of hash functions as check nodes and proven that in the very sparse regime ($0 < \alpha < \frac{1}{3}$) it is a fully random left regular bipartite graph similar to regular LDPC ensemble. Variable and edge degree distribution polynomials are also obtained for this random graph.
2) At every stage of decoding, the peeling decoder recovers some of the variable nodes thus the edges incident to those variable nodes are peeled off the graph. It may be seen that the bipartite graph is very sparse and close to any variable node, and it can be well approximated by a treelike neighborhood. As is usual in the analysis of the BP decoder in the LDPC ensemble, for every edge assuming a tree like neighborhood of depth l, to consider the associated computation tree which allows bounding the expected number of unpeeled edges at every step of decoding.
3) A martingale argument is used to show that the number of unpeeled edges is well concentrated around its expectation. Alternatively, Wormald's method may be used, that uses the differential equation approach to track the evolution of the number of edges in the underlying bipartite graph. It specifically shows that the number of edges at every step of the algorithm is very well concentrated around the solution of these differential equations. Both of these methods (the martingale approach and Wormald's method) give the same result.
4) Both the martingale approach and Wormald's method give a concentration bound to the remaining number of edges as far as their count is a fixed ratio $0 < \gamma < 1$ of the initial edges in the graph. An expander argument is used to show that the remaining graph after peeling $1-\gamma$ ratio of the edges is an expander with very high probability and if the peeling decoder can peel $1-\gamma$ ratio of the edges successfully, it can continue to peel of all off the rest.

In the following the sparse FHT algorithm (previously mentioned as Algorith 2) is stated. Namely:

SparseFHT(x, N, K, C, L, $\Sigma$)
Require: Input signal x of length $N = 2^n$. Sparsity K.
Oversampling C. Number of iterations of decoder L. Array $\Sigma$ of C matrices in
GL(n, $F_2$), $\Sigma_c = |\sigma_{c,1}|...|\sigma_{c,n}|$, $\sigma_{c,i} \in F_2^n$.
Ensure: X contains the sparse Hadamard spectrum of x.
B = O(k)
D = n − b + 1
for c = 1; ... C do
  $U_{c,0}$ = FastHadamardHashing(x, N, $\Sigma_c$, 0, B)
  for d = 1, ..., D do
    $U_{c,d}$ = FastHadamardHashing(x, N, $\Sigma_c$, $\sigma_{c,d}$, B)
  end for
end for
for l = 1, ... , L do

```
for c = 1, ..., C do
  for k = 0, ..., B − 1 do
    if U_{c,O,k} = 0 then
      continue to next k
    end if
    v̂ ← 0
    for d = 1, ..., D do
      if U_{c,d,k}/U_{c,o,k} = −1 then
        v̂_{d−1} ← 1
      else if U_{c,d,k} / U_{c,o,k} ≠ 1 then
        continue to next k
      end if
    end for
    i ← Σ_c^{−T}(Ψ_b k + v̂)
    X_i ← U_{c,O,k}
    for c'=1,...,C do
      j ← Ψ_b^T Σ_{c'}^T i
      U'_{c',O,j} ← U_{c',O,j} − X_i
      for d'=1, ..., D do
        U_{c',d',j} ← U_{c',d',j} − X_i(−1)^{<αc',d',i>}
      end for
    end for
  end for
end for
```

For an N-dimensional signal $x \in R^N$, the support of x is defined as sup $p(x) = \{i \in [N]: x_i \neq 0\}$. The signal x is called K sparse if $|\sup p(x)| = K$, where for $A \subset [N]$, $|A|$ denotes the cardinality of A. For a given (K,N), RS1(K,N) is the class of all stochastic signals whose support is uniformly randomly selected from the set of all $$\binom{N}{K}$$

possible supports. No constraint is put on the nonzero components; they can be deterministic or random. A model RS1 is equivalent to randomly selecting K out of N objects without replacement. If it is assumed that the selection of the indices in the support is done independently but with replacement, this is corresponding to another model that is called RS2(K,N). In particular, if $V_i, i \in [K]$ are i.i.d. random variables uniformly distributed over [N] a random support in RS2(K,N) is given by the random set $\{V_i : i \in [K]\}$. Obviously, the size of a random support in RS2(K,N) is not necessarily fixed but it is at most K. The following proposition shows that in the sublinear sparsity regime RS1 and RS2 are approximately equivalent.

If it is taken into consideration the random support model RS2(K,N), where $K=N^\alpha$ for some fixed $0<\alpha<1$ and H is the random size of the support set, it if note that asymptotically as N tends to infinity H/K converges to 1 in probability. The above statements may be verified as follows: For t belonging to [K], with $H_t$ denoting the size of the random set obtained by picking t objects from [N] independently and uniformly at random with replacement, and at $a_t$ and $v_t$ denoting the average and the variance of $H_t$ for t belonging to [K], it may be seen that $\{H_t\}_{t \in [K]}$ is a Markov process. Thus, $$E[H_{t+1} − H_t | H_t] = \left(1 − \frac{H_t}{N}\right)$$

because the size of the random set increases if and only if we choose an element from $[N \setminus H_t]$. This implies that $a_{t+1} = 1 + \gamma a_t$, where $$\gamma = 1 − \frac{1}{N}.$$

Solving this equation it is obtained $$a_t = \sum_{\tau=0}^{t} \gamma^\tau = \frac{1 − \gamma^{t+1}}{1 − \gamma} = N(1 − \gamma^{t+1}) \quad (7)$$

In particular $$a_K = N\left(1 − \left(1 − \frac{1}{N}\right)^K\right),$$

which implies that $$E\left[\frac{H_K}{K}\right] = \frac{N}{K}\left(1 − \left(1 − \frac{1}{N}\right)^K\right).$$

One can check that for $K=N^\alpha$, $0<\alpha<1$, as N tends to infinity $$E\left[\frac{H_K}{K}\right]$$

converges to 1. To find the variance of $H_t$, the following formula may be used:

$$\text{Var}(H_{t+1}) = \text{Var}(H_{t+1}|H_t) + \text{Var}(E[H_{t+1}|H_t]) \quad (8)$$

Therefore, what is obtained is $$\text{Var}(E[H_{t+1}|H_t]) = \text{Var}(1+\gamma H_t) = \gamma^2 v_t \quad (9)$$

Moreover, for the second part in (8), the following is valied:

$$\text{Var}(H_{t+1} | H_t) = E_{H_t}\{\text{Var}(H_{t+1} | H_t = h_t)\} = \quad (10)$$

$$E_{H_t}\{\text{Var}(H_{t+1} − H_t | H_t = h_t)\} \stackrel{(I)}{=} E\left[\frac{H_t}{N}\left(1 − \frac{H_t}{N}\right)\right] = \frac{a_t}{N} + \frac{a_t^2 + v_t}{N^2}$$

where in (I) is used the fact that given $H_t$, $H_{t+1}−H_t$ is a Bernoulli random variable with probability Ht/N, thus its variance in equal to $$\frac{H_t}{N}\left(1 − \frac{H_t}{N}\right).$$

Combining (9) and (10), what is obtained is $$v_{t+1} = \left(\gamma^2 + \frac{1}{N^2}\right)v_t + \frac{a_t}{N}\left(1 + \frac{a_t}{N}\right) \quad (11)$$

From formula (7), it may be seen that $a_t$ is increasing in t. Moreover, from formula (11) it may be seen that $v_{t+1}$ is increasing function of $a_t$, thus, if we consider the following recursion $$w_{t+1} = \left(\gamma^2 + \frac{1}{N^2}\right)w_t + \frac{a_K}{N}\left(1 + \frac{a_K}{N}\right)$$

then for any $t \in [K]$, $v_t \leq w_t$. As $w_t$ is also an increasing sequence of t, it is obtained that $$v_K \leq w_K \leq w_\infty = \frac{a_K}{N}\left(1 + \frac{a_K}{N}\right) \bigg/ \left(1 - \gamma^2 - \frac{1}{N^2}\right)$$

$$= \frac{a_K}{2}\left(1 + \frac{a_K}{N}\right) \bigg/ \left(1 - \frac{1}{N}\right).$$

Using Chebyshev's inequality, it is obtained that for any $\epsilon > 0$ $$P\left\{\frac{H_K}{K} \geq (1+\epsilon)\right\} \leq \frac{v_K}{K^2\left(\epsilon + 1 - \frac{a_K}{K}\right)^2} = \Theta\left(\frac{1}{\epsilon^2 K}\right).$$

Obviously, $$\frac{H_K}{K} \leq 1,$$

thus $H_K/K$ converges to 1 in probability as N and as a result K tend to infinity.

The above implies that in the sublinear sparsity regime that is under consideration, essentially there is no difference between the sampling with and without replacement. This statement will be expanded upon later in this document while the performance of the peeling decoder over the induced random graph is explained.

The Random Bipartite Graph may be as well constructed with a 'Balls and Bins' Model $q(K, B, C)$ described in the following: Consider C disjoint sets of check nodes S1, S2, . . . , SC of the same size absolute value of $S_i = B$. In accordance with this model a graph in the ensemble of random bipartite graphs q with K variable nodes at the left and C×B check nodes $\cup^C_{i=1} S_i$ at the right is generated as follows: Each variable node u in q, independently from other variable nodes, is connected to check nodes $\{s_1, s_2, \ldots, s_C\}$ where $s_i \in S_i$ is uniformly randomly selected from $S_i$ and selection of $s_i$ is independent of one another. Every edge e in q can be labeled as $(v, c)$, where $v \in [K]$ is a variable node and c is a check node in one of $S_1, S_2, \ldots, S_C$. For a variable node u, the neighbors of $v$ denoted by $N(v)$ consists of C different check nodes connected to u each from one of Si. Similarly, for a check node $c \in \cup^C_{i=1} S_i$, $N(c)$ is the set of all variable nodes connected to c.

Note that by construction, all of the resulting bipartite graphs in the ensemble are left regular with variable degree C. but the check node degree is not fixed. During the construction, it might happen that two variable nodes have exactly the same neighborhood. In that case, they are considered equivalent variables and only one of them is kept and the other is removed. Thus the number of variable nodes in a graph from the ensemble $q(K, B, C)$ might be less than K.

The above described model is a variation of the Balls and Bins model where there are K balls, C buckets of different color each containing B bins and every ball selects one bin from each bucket randomly independent of the other balls.

In this paragraph, note is made regarding terminology from graph theory that will be employed later in this document. A walk of size l in graph q starting from node $v \in [K]$ is a set of l edges $e_1, e_2, \ldots, e_l$, where $v \in e_1$ and where consecutive edges are different, $e_i \neq e_{i+1}$, but incident with each other $e_i \cap e_{i+1} \neq 0$. A directed neighborhood of an edge $e=(v, c)$ of depth l is the induced subgraph in q consisting of all edges and associated check and variable nodes in all walks of size l+1 starting from u with the first edge being $e_1=(v, c)$. An edge e is said to have a tree neighborhood of depth l if the directed neighborhood of e of depth l is a tree.

The random bipartite graphs may be as well generated by hashing as an ensemble of graphs. In the very sparse regime that is considered in this section, $0 < \alpha < \frac{1}{3}$, in order to keep the computational complexity of the hashing algorithm around $O(K \log_2(K))$, the subjective hash $F_2^n$ to $F_2^b$ is used where $b \approx n\alpha$. It is assume that $C = 1/\alpha$ in an integer. Consider $C = 1/\alpha$ hash functions $h_i: F_2^n \to F_2^b$, $i \in [C]$ such that for $x \in F_2^n$ with binary representation $x_0^{n-1}$, $h_i(x_0^{n-1}) = (x_{i\,b}, x_{i\,b+1}, \ldots, x_{i\,b+b-1})$, where $b = n/C$ denotes the dimension of the range of each hash function. This is equivalent to hashing elements of $F_2^n$ into $B = 2^b$ different bins. Notice that by the hashing scheme that it was previously explained is a one-to-one relation between an element x of $F_2^n$ and its hash indices $(h_0(x), h_1(x), \ldots, h_{C-1}(x))$.

If V is uniformly distributed random variable over $F_2^n$ then it may be checked that in the binary representation of V, $V_0^{n-1}$ are like i.i.d. unbiased bits. This implies that $h_0(V)$, $h_1(V), \ldots, h_{C-1}(V)$ will be independent from one another because they depend on disjoint subsets of $V_0^{n-1}$. Moreover, $h_i(V)$ is uniformly distributed over $F_2^b$.

Assuming that $x_1, x_2, \ldots, x_K$ are K different variables in $F_2^n$, for these K variables and hash functions $h_i$, the bipartite graph may be associated as follows: K variable nodes are considered corresponding to $x_1^K$ and C different set of check nodes $S_0, S_1, \ldots, S_{C-1}$ to each of size $B = 2^b$. The check nodes in each $S_i$ are labeled by elements of $F_1^b$. For each variable $x_i$, C is considered with different edges connecting $x_i$ to check nodes labeled with $h_j(xi) \in S_j$, $j \in [C]$.

$h_i: F_2^n \to F_2^b$, $i \in [C]$ has been explained before in this document, and $V_1^K$ is a set of variables generated from the ensemble RS2(K,N), $N = 2^n$ denoting the position of non-zero components. The bipartite graph associated with variables $V_1^K$ and hash functions $h_i$ is a graph from ensemble q (K,B,C), where $B = 2^b$. As $V_1^K$ belong to the ensemble RS2(N,K), they are i.i.d. variables uniformly distributed in [N] which implies that for a specific $V_i$, $h_j(V_i)$, $j \in [C]$ they are independent from one another. Thus every variable node selects its neighbor checks in $S_1, S_2, \ldots, S_r$ completely randomly. Moreover, for any $j \in [C]$, the variables $h_j(V_1), \ldots, h_j(V_K)$, are also independent, thus each variable selects its neighbor checks in $S_j$ independent of all other variables. This implies that in the corresponding bipartite graph, every variable node selects its C check neighbors completely randomly independent of other variable nodes, thus it belongs to q (K,B,C).

Earlier in this document, it was explained the behavior of the peeling decoder over the bipartite graph induced by the nonzero spectral components. As it may be seen the performance of the algorithm always improves if some of the variable nodes are removed from the graph because it potentially reduces the number of colliding variables in the graph and there is more chance for the peeling decoder to succeed decoding.

If $\alpha$, C, K, $h_i$, $i \in [C]$ are as explained before, let q be the bipartite graph induced by the random support set $V_1^K$ generated from RS1 and hash functions $h_i$. Then for any $\epsilon > 0$, asymptotically as N tends to infinity, the average failure probability of the peeling decoder over q is upper bounded by its average failure probability over ensemble q(K(1+ε), B, C).

Let $q_\epsilon$ be a graph from ensemble q (K(1+ε), B, C). From a previous proposition, it is evident that asymptotically the number of variable nodes in $q_\epsilon$ is greater than K. If some of the variable nodes are randomly dropped from $q_\epsilon$ to keep only K of them, a graph is obtained from ensemble q. From the explanation of the peeling decoder, it may be seen that the performance of the decoder improves by removing some of the variable nodes because in that case less variables are collided together in different bins and there is more chance to peel them off. This implies that peeling decoder performs strictly better over q compared with $q_\epsilon$.

If the graph induced by $V_1^K$ from RS1 is considered and hash functions h the edge connection between variable nodes and check nodes is not completely random thus it is not compatible with Balls-and-Bins model explained before. From a proposition made above it is implied that asymptotically the failure probability for this model can be upper bounded by the failure probability of the peeling decoder for Balls-and-Bins model of slightly higher number of edges K(1+ε).

Edge degree distribution polynomial: as it was explained in the previous section, assuming a random support model for nonzero spectral components in the very sparse regime 0<α<⅓, a random graph is obtained from ensemble q (K,B,C). It was also assumed that nα∈N and b was selected as nα, thus K=B. Let β=K/B be the ratio between the number of nonzero components and the number of bins in hashing operation. From the random support model, it results that β is the average of nonzero components assigned to a bin of hash. In this case, the hashes were designed so that β=1. As the resulting bipartite graph is left regular, all of the variable nodes have the degree C. For a specific check node the degree is random and it depends on the graph.

Let q (K,B,C) be the random graph ensemble as before with β=K/B fixed. Then asymptotically as N tends to infinity the check degree converges to a poisson random variable with parameter β.

The construction of the ensemble q shows that any variable node has a probability of 1/β to be connected to a specific check node, c, independent of all other variable nodes. If $Z_i \in \{0, 1\}$ is a Bernoulli random variable where $Z_i = 1$ if and only if variable i is connected to c. It is easy to check that the degree of c will be $Z = \sum_{i=1}^{K} Z_i$. The Characteristic function of Z can be easily obtained.

$$\Phi_Z(\omega) = E[e^{j\omega Z}] = \prod_{i=1}^{K} E[e^{j\omega Z_i}] = \left(1 + \frac{1}{B}(e^{j\omega} - 1)\right)^{\beta B} \to e^{\beta(e^{j\omega}-1)}$$

Showing the convergence of Z to a Poisson distribution with parameter β.

For a bipartite graph, the edge degree distribution polynomial is defined by $\rho(\alpha) = \Sigma \rho_i \alpha^{i-1}$ and $\lambda(\alpha) = \Sigma \lambda_i \alpha^{i-1}$, where $\rho_i$ ($\lambda_i$) is the ratio of all edges that are connected to a check node (variable node) of degree i. Notice that the formula includes i−1 instead of i. This choice makes the analysis to be written in a more compact form.

Let q be a random bipartite graph from the ensemble q (K, B, C) with β=K/B. Then $\lambda(\alpha) = \alpha^{C-1}$ and ρ(α) converges to $e^{-\beta(1-\alpha)}$ as N tends to infinity.

From left regularity of a graph from ensemble q, it results that all of the edges are connected to variable nodes of degree C., thus $\lambda(\alpha) = \alpha^{C-1}$ and the number of edges is equal to C K. As all of the hashes are equivalent, it is sufficient to obtain the edges degree distribution polynomial for check nodes of only one hash. The total number of edges that are connected to check nodes of hash 1 is equal to K. Let $N_i$ be the number of check nodes in this hash with degree i. By definition of $\rho_i$, it results that $$\rho_i = \frac{iN_i}{K} = \frac{iN_i/B}{K/B}.$$

Let Z be the random variable denoting the degree of a specific check node. Then, as N tends to infinity it can be shown that $$\lim_{N \to \infty} \frac{N_i}{B} = \lim_{N \to \infty} P\{z = i\} = \frac{e^{-\beta}\beta^i}{i!} \text{ a.s.}$$

Thus $\rho_i$ converges almost surely to $$\frac{e^{-\beta}\beta^{i-1}}{(i-1)!}.$$

As $\rho_i \le 1$ for any α: [α]<1−ε, $[\rho_i \alpha^{i-1}] \le (1-\epsilon)^{i-1}$ and applying the Dominated Convergence Theorem, ρ(α) converges to $$\sum_{i=1}^{\infty} \frac{e^{-\beta}\beta^{i-1}}{(i-1)!} \alpha^{i-1} = e^{-\beta(1-\alpha)}.$$

The average check degree parameter β: In the very sparse regime, as we explained assuming that b=nα is an integer, the independent hashes are designed with $B=2^b$ output bins such that β=K/B=α. As it will be seen as well while discussing the performance of the peeling decoder (described in the following), it depends on parameter β. The less β the better the performance of the peeling decoder. Also decreasing β via increasing B increases the time complexity O(B $\log_2(B)$) of computing the hash function. For the general case, one can select B such that β∈(1, 2) or at the cost of increasing the computation make β smaller for example β∈(½, 1). The other issue is the number of hashes C. For 0<α<⅓, one can always select at least 3 different hashes. For all αε{1/r:r∈N} one can keep the hashing complexity at O(K $\log_2(K)$) by selecting r different hashes. For intermediate values of a, one can construct [1/α] hashes with $2^{[n\alpha]}$ output bins and one hash with smaller number of output bins.

In the following the performance of the Peeling Decoder will be discussed. Assume that q is the random bipartite graph resulted from applying C hashes to signal spectrum with left nodes (variable nodes) corresponding to nonzero spectral components and with right nodes (check nodes) corresponding to different bins of the hash functions applied. As it was explained above, the iterative peeling algorithm starts by finding a singleton (check node of degree 1 which contains only one variable node or nonzero spectral components). The decoder peels off this variable node and removes it and all of the edges connected to it from the graph. The algorithm continues by peeling off a singleton at each step until all of the check nodes are zeroton; all of the nonzero variable nodes are decoded, or all of the remaining unpeeled check nodes are multiton in which case the algorithm fails to completely decode the spectral components.

In order to analyze the behavior of the resulting random graphs under peeling decoding, in the art Wormald's method was applied to track the ratio of edges in the graph with corresponding check degree 1 (singleton). The essence of the Wormald's method is to approximate the behavior of a stochastic system (here the random bipartite graph), after applying suitable time normalization, by a deterministic differential equation. The idea is that asymptotically as the size of the system becomes large (thermodynamic limit), the random state of the system is, uniformly for all times during the run of the algorithm, well concentrated around the solution of this differential equation. Using this method the performance of the peeling decoder for bipartite graph codes over the BEC channel was analyzed. A modification of the results found in the art can be applied to our case.

Assuming for example that we have a bipartite graph B with k variable nodes at the left, c k check nodes at the right and with edge degree polynomials $\lambda(x)$ and $\rho(x)$. A channel code C(B) can be defined over this graph as follows: We assign k independent message bits to k input variable nodes. The output of each check node is the module 2 summation (XOR or summation over $F_2$) of all the message bits that are connected to it. Thus, the resulting code will be a systematic code with k message bits along with c k parity check bits. To communicate k bit message over the channel, we send k message bits along with all of the check bits associated with them. While passing through the BEC some of the message bits or check bits are erased independently. Assume a specific case in which the message bits and check bits are erased with probability $\delta$ and $\delta'$ respectively. Those message bits that pass perfectly through the channel are successfully transmitted and the decoder tries to recover the erased message bits from the redundant information received via check bits. If we consider the induced graph after removing all variable nodes and check nodes corresponding to the erased ones from B, we end up in another bipartite graph B'. It is easy to see that over the new graph B', one can apply the peeling decoder to recover the erased bits.

In the art, a full analysis of this problem was done for the case $\delta'=0$, where all of the check bits are received perfectly but $\delta$ ratio of the message bits are erased independently from one another. In other words, the final graph B' has k$\delta$ variable nodes to be decoded. Therefore the analysis can be simply applied to our case, by assuming that $\delta \to 1$, where all of the variable nodes are erased (they are all unknown and need to by identified) and we know the output of every bin in different hashes ($\delta'=0$: no check bit is erased). In particular, in the art it was stated that:

If B is a bipartite graph with k message bits that is chosen at random with edge degrees specified by $\lambda(x)$ and $\rho(x)$. Let $\delta$ be fixed so that $\rho(1-\delta\lambda(x))>1-x$, for $x\in(0;1)$ For all $\eta>0$, there is some $k_0$ such that for all $k>k_0$, if the message bits of C(B) are erased independently with probability $\delta$, then with probability at least $1-k^{2/3} \exp(-\sqrt[3]{k}/2)$ the recovery algorithm terminates with at most $\eta k$ message bits erased.

Replacing $\delta=1$ in the proposition above, we obtain the following performance guaranty for the peeling decoder.

If q is a bipartite graph from ensemble q (K, B, C) induced by hashing functions $h_i$, i, $\in[C]$ as explained before with $\beta=K/B$ and edge degree polynomials $\lambda(x)=x^{C-1}$ and $\rho(x)=e^{-\beta(1-x)}$ such that $\rho(1-\lambda(x))>1-x$, for $x\in(0, 1)$.

Given any $\epsilon\in(0, 1)$, there is a $K_0$ such that for any $K>K_0$ with probability at least $1-K^{2/3} \exp(-\sqrt[3]{K}/2)$ the peeling decoder terminates with at most $\epsilon K$ unrecovered nonzero spectral components.

The above stated proposition does not guaranty the success of the peeling decoder. It only implies that with very high probability, it can peel off any ratio between (0; 1) of nonzero components but not necessarily all of them. However, using a combinatorial argument, it is possible to prove that with very high probability any graph in the ensemble q is an expander, namely, every small enough subset of left nodes has many check neighbors. This implies that if the peeling decoder can decode a specific ratio of variable nodes, it can decode all of them. A modification of what is known in the art gives the following result:

Let q be a graph from ensemble q (K, B, C) with C≥3. There is some $\eta>0$ such that with probability, the recovery process restricted to the subgraph induced by any $\eta$-fraction of the left nodes terminates successfully.

If S is any set of variable nodes of size at most $\eta K$, where $\eta$ is chosen later, Ni(S), with $i\in[C]$ is the check neighbors of G in hash i. If for at least one of the hashes $$i \in [C], |N_i(S)| > \frac{|S|}{2},$$

it results that there is at least one check node of degree 1 (a singleton) among the neighbors, which implies that the peeling decoder can still proceed to decode further variable nodes.

If $\epsilon_s^i$ denotes the event that a specific subset A of size s of variable nodes has at most s/2 check neighbors in hash i. Also, $\epsilon_S = \cap_{i=1}^C \epsilon_S^i$. By the construction of G, it may be seen that $$P\{\epsilon_S\} = \Pi_{i=1}^C P\{\epsilon_S^i\}.$$

If T is any subset of check nodes in hash i of size s/2, the probability that all of the neighbors of A in hash i belong to a specific T is equal to $$\left(\frac{s}{2B}\right)^s.$$

Taking a union bound over $$\binom{B}{s/2}$$

of all such set T, it is seen that $$P\{\epsilon_s^i\} \leq \binom{B}{s/2}\left(\frac{s}{2B}\right)^s,$$

which implies that $$P\{\epsilon_s^i\} \leq \left(\binom{B}{s/2}\left(\frac{s}{2B}\right)^s\right)^C.$$

Taking a union bound over all possible subsets of size s of variables, what is obtained is $$P\{F_s\} \leq \binom{K}{s} P\{\varepsilon_s\} \leq \binom{K}{s}\left(\binom{B}{s/2}\left(\frac{s}{2B}\right)^s\right)^C \leq \left(\frac{eK}{s}\right)^s\left(\frac{2eB}{s}\right)^{sC} \leq \frac{u^s s^{s(C/2-1)}}{K^{s(C/2-1)}}$$

where $$u = e^{C/2+1}\left(\frac{\beta}{2}\right)^{C/2}.$$

Other knowledge that is used is that for $$n \leq m, \binom{n}{m} \leq \left(\frac{ne}{m}\right)^m$$

and $P\{F_1\}=P\{F_2\}=0$. Selecting $$\eta = \frac{1}{2u^{2/(C-2)}},$$

what is obtained is that $$\sum_{s=1}^{\eta K} P\{F_s\} = \sum_{s=3}^{\eta K} P\{F_s\}$$

$$= \sum_{s=3}^{\eta K} \frac{u^s s^{s(C/2-1)}}{K^{s(C/2-1)}}$$

$$= O\left(\frac{1}{K^{3(C/2-1)}}\right) + \sum_{s=4}^{\eta K}\left(\frac{1}{2}\right)^s$$

$$= O\left(\frac{1}{K^{3(C/2-1)}}\right).$$

In the very sparse regime $0<\alpha<\frac{1}{3}$, we consider $1/\alpha$ hashes with output size $2^{n\alpha}$, thus the number of hashes $C \geq 3$.

In the following another method of analysis is given and further intuition about the performance of the peeling decoder and why it works really well in the very sparse regime. This analysis is based on Belief Propagation over Sparse Graphs: The second method is based on the analysis of BP decoder over sparse locally tree-like graphs. This analysis is very similar to the analysis of the peeling decoder to recover nonzero frequency components available in the art. Consider a specific edge $e=(v, c)$ in a graph from ensemble q (K, B, C). Consider a directed neighborhood of this edge of depth l. At the first stage, it may be seen that this edge is peeled off from the graph assuming that all of the edges (c, v') connected to check node c are peeled off because in that case check c will be a singleton allowing to decode the variable v. One can proceed in this way in the directed neighborhood to find the condition under which the variable v' connected to c can be peeled off and so on. As we assume that the directed neighborhood is tree all of the messages that are passed from the leaves up to the head edge e are independent from one another. Let $p_l$ be the probability that edge e is peeled off depending on the information received from the directed node of depth l assuming a tree up to depth l. A similar to that available in the art, gives the following recursion:

$$p_{j+1} = \lambda(1-\rho(1-p_j)), j \in [l] \tag{12}$$

where $\lambda$ and $\rho$ are edge degree polynomials of the ensemble q. This iteration shows the progress of the peeling decoder in recovering unknown variables nodes. In the art, it was proved that for any specific edge e, asymptotically with very high probability the directed neighborhood of e is tree. Specifically, if we start from a left regular graph q from q (K, B, C) with KC edges, after l steps of decoding the average number of unpeeled edges is concentrated around $KCp_l$. Moreover, a martingale argument was applied to show that not only the average of unpeeled edges is approximately $KCp_l$ but also with very high probability the number of edges remained is concentrated around $KCp_l$.

Equation (12) is in general known as density evolution equation. Starting from $p_0=1$, this equation fully predicts the behavior of the peeling decoding over the ensemble q. Figure shows a typical behavior of this iterative equation for different values of the parameter $\beta=K/B$. For very small values of $\beta$, this equation has only a fixed point 0 which implies that asymptotically the peeling decoder can recover a very close to 1 ratio of the variables. However, for very large values of $\beta$, this equation has a fixed point greater than 0. The largest fixed point of this iteration is the point where the peeling decoder is stuck and can not proceed to fully decode all of the variables. It is easy to see that the only fixed point is 0 provided that for any $p \in (0, 1)$, $p > \lambda(1-\rho(1-p))$. As $\lambda:(0, 1)\lambda \to (0, 1)$, $\lambda(x)=x^{C-1}$ is an increasing function of x, doing change of variable $x=\lambda^{-1}(p)$, we obtain that $x>1-\rho(1-\lambda(x))$ or equivalently: $\rho(1-\lambda(x))>1-x$, for $x \in (0, 1)$ This is exactly the same result that we obtained by applying the Wormald's method. In particular this analysis clarifies the role of x in Wormald's analysis. Similar to the Wormald's method, this analysis only guaranties that for any $\epsilon \in (0, 1)$, asymptotically as N tends to infinity $1-\epsilon$ ratio of the variable nodes can be recovered. An expander argument is again necessary to guaranty full recovery of all the variables.

As discussed earlier in this document, the signals have been divided into two parts: with very sparse and less sparse regime. Different constructions and distinct analysis methods are be applied for these two cases. As also mentioned, in all of the above what were discussed were the signals with very sparse regime. Depending on the sparsity level of the signal, the application of this distinction and of distinct analysis methods are required in order to keep the computational complexity low, at the desired level. Signals whose transform is "nearly sparse" are the signals wherein noise is added to an initially sparse signal. In this case the method will indicate the dominant coefficients in the transformed domain.

The less-sparse regime where $\frac{1}{3}<\alpha<1$. If, as in the previous section of this document where signals of the very sparse regime are discussed, we choose $b \approx \alpha n$, then the rows of the hashing matrices h1, . . . , hC cannot be linearly independent anymore. This means that the equivalence between the B&B model from the previous section and the linear hash construction is lost. It ensues that the techniques used in the previous section cannot be applied in this regime.

Instead, in order to analyze the signals of less sparse regime, a combinatorial argument may be relied upon. The construction of the deterministic matrices starts by performing deterministic hashing by giving a framework to construct the hash functions in all regimes. If $\sigma_0, \ldots,$ $\sigma_{n-1} \in F_2^n$ are elected be a set of n linearly independent vectors, the hashing matrices $\Sigma_1, \ldots, \Sigma_C$ are set to be:

$$\Sigma_i = [\sigma_{a+b} \ldots \sigma_{n-1} \sigma_0 \ldots \sigma_{a+b-1}], i=1, \ldots C$$

Where $$a = \begin{cases} (i-1)\frac{n}{C} & \text{if } 0 < \alpha < 2/3, \\ n-b & \text{if } 2/3 \leq \alpha < 1 \end{cases}$$

An alternative that is universal with regard to the input signal x, and that works well in practice is to choose the hashing matrices uniformly at random over the set of invertible matrices in $F_2^{n \times n}$.

For the particular case of an approximately sparse signal in the Hadamard domain, the algorithm can be extended to recover the K dominant Hadamard spectrum coefficients.

Therefore to summarize, the present invention proposes a computer-implemented method for determining the Walsh-Hadamard transform of N samples of a signal, comprising: electing a plurality of hashing C matrices $\Sigma_1, \ldots \Sigma_C$; computing C hashes of a particular length based at least on a hashing front end and said plurality of matrices $\Sigma_1, \ldots \Sigma_C$; forming a bipartite graph with a plurality of variable nodes and a plurality of check nodes, wherein said variable nodes are non-zero coefficients to recover, and said check nodes are hashed samples; finding an isolated check node and recovering non-zero coefficients connected to said isolated check node by employing collision detection and support estimation of said signal; peeling from said bipartite graph the recovered non-zero coefficients, and repeating said computing step, forming step, finding step and peeling step until all the nodes in said plurality of check nodes are zero.

Figure 4:
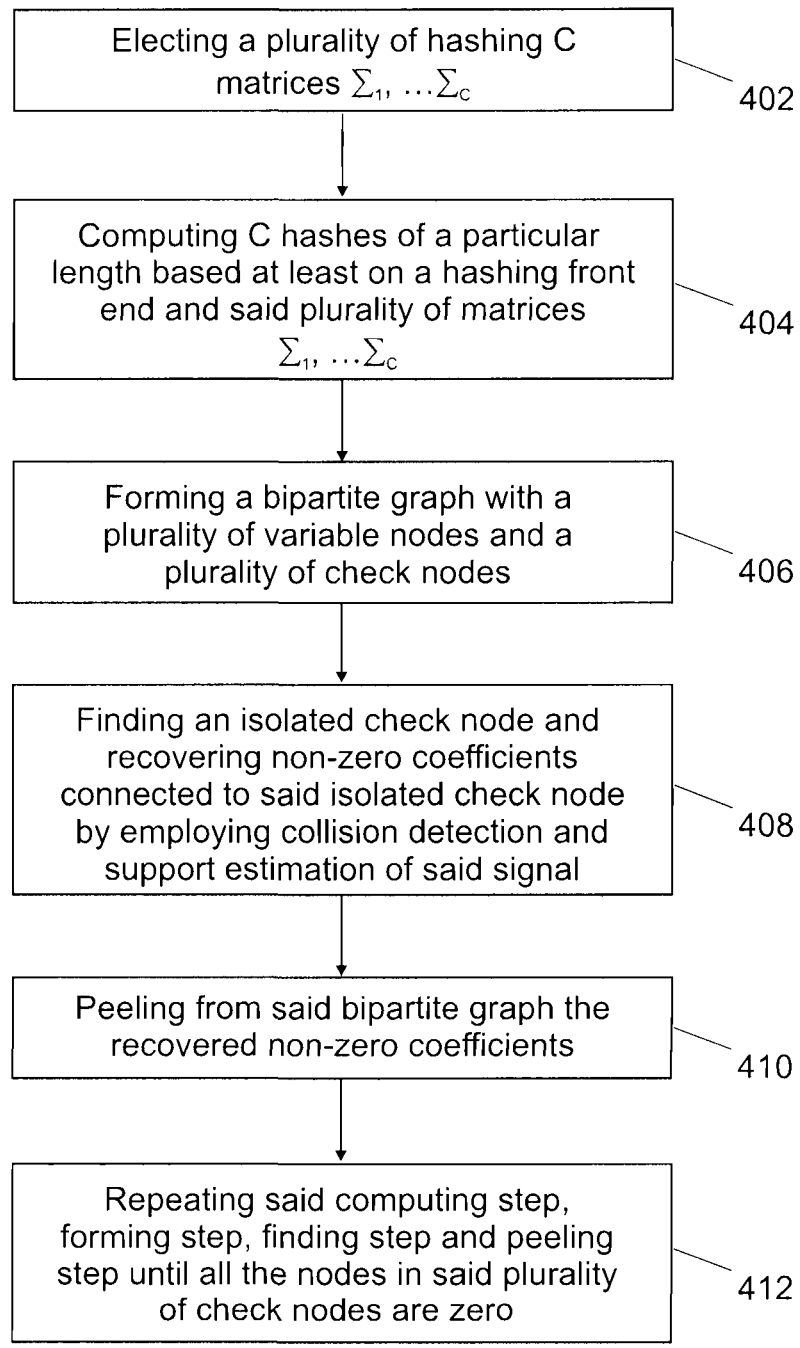
FIG. 4 represents a flow chart of the method of the invention proposed in accordance with the present invention.

FIG. 4 represents a flow chart of the method of the invention proposed in accordance with the present invention.

As it is illustrated in the flow chart of FIG. 4, the present invention concerns a computer-implemented method 400 for determining the Walsh-Hadamard transform of N samples of a signal, comprising: the step 402 of electing a plurality of hashing C matrices $\Sigma_1, \ldots \Sigma_C$ followed by the step 404 of computing C hashes of a particular length based at least on a hashing front end and said plurality of matrices $\Sigma_1, \ldots \Sigma_C$, followed by the step 406 of forming a bipartite graph with a plurality of variable nodes and a plurality of check nodes, wherein said variable nodes are non-zero coefficients to recover, and said check nodes are hashed samples. The method also comprises the steps of finding 408 an isolated check node and recovering non-zero coefficients connected to said isolated check node by employing collision detection and support estimation of said signal and the steps of peeling 410 from the bipartite graph the recovered non-zero coefficients. The steps 404 to 410 are repeated until all the nodes in the plurality of check nodes are zero.

The method further comprises the step of exploiting an priori known K sparsity in a domain of said transform. The method further comprises subsampling the signal to create controlled interferences in a domain of said transform. The C hashes are selected as functions depending on a priori known non uniformity of the signal to transform. In accordance with the present invention the step of computing C hashes comprises applying a hashing function resulting in C check nodes, each check node being expressed as a sum of B variables $(X_1, X_2, \ldots, X_C)$ corresponding to samples in the transformed domain. A number of non-zero variables in each check node is at most two due to the sparsity in the transformed domain.

As stated above in summary the present invention concerns a low-complexity algorithm to compute the length N Hadamard transform of data K-sparse in the Hadamard domain. The complexity of this algorithm is $O(K \log_2 K \log_2 N/K)$. The complexity of the presently presented algorithm is in contrast with the state-of-the-art fast Hadamard transform algorithm that has complexity $O(N \log_2 N)$.

The present invention utilizes three main components, that have been already described in detail in this document and that will be again presented in summary form in the following:

A hashing front-end;
A collision detector and support estimator;
A peeling algorithm to recover the K main Hadamard spectral coefficients from a number of hashes.

As already stated above, the algorithm in accordance with the present invention, assumes that parameter K is the sparsity, N the length of the signal and comprises at least the steps of:

Picking C matrices $\Sigma_1, \ldots, \Sigma_C$;
Using the hashing front end and $\Sigma_1, \ldots, \Sigma_C$, to compute C hashes of length $B=K/\beta$. This will form a bipartite graph where variable nodes are the non-zero coefficients to recover, and the check nodes are the hashed samples;
Using collision detection and support estimation, finding an isolated check node and recover the non-zero coefficient connected to it. Peel the recovered coefficient from the graph;
Go again to the computing step and repeat all the steps until no isolated check nodes are left. If all the check nodes are zero at the end, the algorithm has succeeded.

The algorithm proposed by the present invention is randomized and succeeds with a probability strictly less than one. This probability can be controlled through the choice of C and $\beta$. The creation of the check nodes of the sparse bipartite graph from the time-domain samples is conceptually represented as a block diagram in FIG. 2. FIG. 2 represents a block diagram of the processing of time-domain samples into check nodes of the sparse bipartite graph. The downsampling and delay formalism of FIG. 2 are used to denote hashing by h and shift by $\sigma i$. The S/P and P/S block are serial-parallel and parallel-serial blocks to emphasize that the FHT operates on the whole signal at once. Finally, the collision detection/support estimation block implements the collision detection/support estimation steps. Index i is not valid when there is a collision.

Referring now in particular to the steps of the inventive method electing a plurality of hashing C matrices $\Sigma_1, \ldots \Sigma_C$ and computing C hashes of a particular length based at least on a hashing front end and said plurality of matrices $\Sigma_1, \ldots \Sigma_C$, in the following the hash construction will be discussed in detail. Detail references to means and steps of the hash construction have been as well included in earlier portions of this document.

For the hash construction, the signal is considered with sparsity $K=N^\alpha$. In the following three possible different deterministic hash constructions for three regimes of the parameter $\alpha$ are described. The following parameters are considered: the number of hashing matrices is C, $\beta$ is fixed as being equal to 1, and the hash length b is equal to $\log_2 B$. It is generally assumed that $b=\alpha n$, i.e. $K=B$, and that the numbers work out. When this is not the case, b may be elected as being slightly more than an so that the numbers work out without affecting the complexity too much.

A framework to construct the hash functions in all regimes is provided at the beginning Pick $\sigma_0, \ldots, \sigma_{n-1} \in F_2^n$ as a set of n linearly independent vectors. The matrices $R_i$, $i=1, \ldots, C$, are formed whose columns are $$\sigma_{(i-1)\frac{1-\alpha}{C}n}, \ldots, \sigma_{i\frac{1-\alpha}{C}n-1}$$

with $0 \leq \alpha < 1$. Let in addition $\bar{R}$ have columns $\sigma_{(1-\alpha)n}, \ldots, \sigma_{n-1}$. Note that we describe here the construction of the matrices $\Sigma_1, \ldots, \Sigma_C$, from which we derive the hashing matrices from the equation indicative of the index hashing function. This hashing function will be reiterated again shortly.

The construction of the deterministic matrices starts by performing deterministic hashing by giving a framework to construct the hash functions in all regimes. If $\sigma_0, \ldots, \sigma_{n-1} \in F_2^n$ are elected be a set of n linearly independent vectors, the hashing matrices $\Sigma_1, \ldots \Sigma_c$ are set to be:

$$\Sigma_i = [\sigma_{a+b} \ldots \sigma_{n-1} \sigma_0 \ldots \sigma_{a+b-1}], i=1, \ldots C$$

Where $$a = \begin{cases} (i-1)\frac{n}{C} & \text{if } 0 < \alpha < 2/3, \\ n-b & \text{if } 2/3 \leq \alpha < 1 \end{cases}$$

An alternative that is universal with regard to the input signal x, and that works well in practice is to choose the hashing matrices uniformly at random over the set of invertible matrices in $F_2^{n \times n}$.

For the particular case of an approximately sparse signal in the Hadamard domain, the algorithm can be extended to recover the K dominant Hadamard spectrum coefficients.

The parameters C and β can be optimally picked to reduce the overall complexity of the algorithm.

The present invention concerns matrix operations over a binary field. The computation over the binary fields may be accelerated. There are at least two ways to accelerate these computations over binary fields:

When derandomizing, pick $\Sigma_1, \ldots, \Sigma_C$ so that to minimize the complexity of the algorithm. In practice, this means picking $\sigma_0, \ldots, \sigma_{n-1}$ as the canonical basis vectors shown above, for example $\sigma_i$ being the vector with 1 at $i^{th}$ coordinate, and zero everywhere else;

The matrix operations over the binary field can be replaced by look-up tables.

The present application finds applicability among others in two domains: the domain of mobile communication and the domain of spectroscopy. In mobile communications a number of spread spectrum communications use Walsh-Hadamard functions to separate users in a shared medium, such as the communications performed in WCDMA. If there are only K users sharing the channel with a length-N spreading code, the invention can be used to jointly decode the signal of these users. Alternatively, if there are only a few dominant users, they can be jointly decoded while ignoring the low-power users. In spectroscopy the Hadamard transform can be used to reduce the measurement error in optical spectroscopy applications. If the spectrum happens to be sparse (which can assumed to be the case in many practical cases), the number of Hadamard measurements to be taken can be reduced, thus lowering the manufacturing cost of the optical hardware.

As it may have already been mentioned in this document, by [N] is denoted the set of all integers $\{0, 1, \ldots, N-1\}$. Further, x is a vector of size $N=2^n$ for some $n \in N$. For $i \in [N]$, the i-th component of x, $x_i$, is denoted by $x_{m_0, m_1, \ldots, m_{n-1}}$ where $m_0, m_1, \ldots, m_{n-1}$ is the binary expansion of i with $m_0$ being the least significant bit. The WHT of size $N=2^n$ of x is defined as follows:

$$X_{k_0, \ldots, k_{n-1}} = \sum_{m_0=0}^{1} \ldots \sum_{m_{n-1}=0}^{1} (-1)^{k_0 m_0 + \ldots + k_{n-1} m_{n-1}} x_{m_0, \ldots, m_{n-1}}$$

where $[k_0, \ldots, k_{n-1}]^T \in F_n^2$ is the corresponding binary indexing of the transform domain component and where $F_n^2 = \{0,1\}^n$ denotes the set of all binary vectors of dimension n. To simplify the notation, from now on we consider all indices to be elements of $F_n^2$. The inner products of two vectors in $F_n^2$ is defined as usual $$(k, m) = k^T m = \sum_{i=0}^{n-1} k_i m_i$$

where additions and multiplications are modulo two. With this notation, it is possible to write the WHT in the following compact form $$X_k = \sum_{m \in F_2^n} (-1)^{(k,m)} x_m$$

$$k \in F_n^2$$

Also, through the present document some terminology is borrowed from the discrete Fourier transform and call the transform domain components by frequency or spectral components of the vector.

In the following, by applying the basic properties of the WHT, the hashing algorithm in the spectral domain is summarized. Assuming that $\Sigma \in GL(n, F_2)$ and $p \in F_n^2$, and $b \in N$, $B=2^b$ and m, $k \in F_n^2$ denote the time and frequency indices of a B dimensional vector $$u_{\Sigma,p}(m) = \sqrt{\frac{N}{B}} x_{\Sigma \Psi_b m + p}$$

indexed by $m \in F_n^2$ where $N=2^n$. Then, the length B Hadamard transform of $u_{\Sigma,p}$ is given by $$U_{\Sigma,p}(k) = \sum_{i | h_\Sigma(i)=k} X_i (-1)^{\langle p, i \rangle}$$

where $h_\Sigma$ is the index hashing function defined by $$h_\Sigma(i) = \Psi_b^T \Sigma^T i$$

where $$\Psi_b = [0_{b \times (n-b)} I_b]^T$$

Based on all of the above that concerns hashing, in accordance with the present invention an Algorithm 1 is provided which computes the hashed Hadamard spectrum. Given an FFT-like fast Hadamard transform (FHT) algorithm, and picking B bins for hashing the spectrum, Algorithm 1 requires O(B log B) operations. The algorithm is summarized bellow as follows:

FastHadamardHashing (x, N, Σ, p, B)
Require: Signal x of length N, randomized parameters Σ and p and given number of bins B.
Ensure: U contains the hashed Hadamard spectrum of x.

$$u_m = x_{\Sigma \Psi_b m + p} \text{ for } m \in F_2^b.$$

$$U = \sqrt{\frac{N}{B}} \text{ FastHadamard}(u_m, B).$$

In accordance with the present invention, a mechanism is proposed that allows both to identify collision between the nonzero spectral coefficients that are hashed to the same bin and also to estimate the support of non-colliding components. This mechanism is summarized in the following:
More precisely, $U_{\Sigma,p}$ (k) is considered for two cases p=0 and p≠0. Then it may be seen that in the former case $U_{\Sigma,p}$ (k) is obtained by summing all of the spectral components with indices satisfying $h_\Sigma(i)=k$ whereas in the latter case the same components are added together weighted by $(-1)^{(p,i)}$.
A ratio test is defined as follows:

$$r_{\Sigma,p}(k) = \frac{U_{\Sigma,p}(k)}{U_{\Sigma,0}(k)}$$

When the sum in $U_{\Sigma,p}$(k) contains only one non-zero component, it may be seen that the absolute value of $r_{\Sigma,p}$(k)=1 for any value of p. However, if there is more than one component in the sum, under a very mild assumption on the distribution of the non-zero coefficients of the spectrum (i.e. they are generated by a continuous distribution), one can show that the absolute value of $r_{\Sigma,p}$(k)≠1 for at least some values of p. In fact, n−b well-chosen values of p allow to detect whether there is only one, or more than one non-zero components in the sum.
When there is only one $X_i$≠0 such that $h_\Sigma(i')=k$, the result of the ratio test is precisely 1 or −1, and, in addition, reveals the value of the inner product between i' and p $$\langle p, i \rangle = 1_{\{r_{\Sigma,p}(k) < 0\}}$$

where $1_{\{t<0\}}=1$ if t<0, and zero otherwise. Hence, if for n−b well-chosen values of p, the ratio test results in 1 or −1, implying that there is only one nonzero spectral coefficient in the corresponding bin, by extra effort is possible to identify the support of the only non-zero component. This result is formalized in the following proposition regarding the collision detection/support estimation:

Regarding collision detection/support estimation: If Σ∈GL(n, $F_2$) and if $\sigma_i$, i∈[n] denote the columns of matrix Σ, then:
1) If ∀d∈[n−b], absolute value of $r_{\Sigma,\sigma_d}$ (k)=1 then almost surely there is only one coefficient in the bin indexed by k. Moreover, if it is defined $$\hat{v}_d = \begin{cases} 1_{\{r_{\Sigma,\sigma_d(k)}<0\}} & d \in [n-b], \\ 0 & \text{otherwise,} \end{cases}$$

the index of the unique nonzero coefficient is given by $$i = \Sigma^{-T}(\Psi_b k + \hat{v}) \quad (6)$$

2) If there exists a d∈[n−b] such that $|r_{\Sigma,\sigma_d(k)}|$≠1 then the bin k contains more than one nonzero coefficient.

In accordance with the present invention the method proposed by the invention also comprises forming a bipartite graph with a plurality of variable nodes and a plurality of check nodes, the variable nodes being non-zero coefficients to recover, and the check nodes being hashed samples, finding an isolated check node and recovering non-zero coefficients connected to the isolated check node by employing collision detection and support estimation of the signal as described in summary above and peeling from the bipartite graph the recovered non-zero coefficients, as it will be described in the following.

If signal x is a N dimensional signal, where N=$2^n$, with WHT X, where X has only K non-zero components with K=O($N^\alpha$), for some 0<α<1, scaling sublinear in N. As $H_N^{-1}=H_N$, taking the inner product of the vector X with the i-th row of the Hadamard matrix $H_N$, a time domain sample $x_i$ is obtained. Using terminology from the coding theory, it is possible to consider the spectral components X as variables nodes and the inner product of the i-th row of $H_N$ a check node constraint on X. For example, the first row of the Hadamard matrix is the all-one vector which implies that the sum of all of the components of X must be equal to the first time domain sample. A similar interpretation holds for the other rows. As such the recovery of the nonzero coefficients is treated as a decoding problem. While considering the WHT, it may be seen that the induced bipartite graph on the nonzero spectral values is a complete (dense) bipartite graph as depicted in the right part of FIG. 3.

For codes on bipartite graphs, there is a collection of low complexity belief propagation algorithms to recover the variable node components given the check node constraints. Almost all of these algorithms work under the sparsity assumption on the underlying bipartite graph. Although the graph corresponding to WHT is dense, by subsampling the time domain components of the signal it is possible to hash the spectral components in bins which allows to induce a sparse bipartite graph in the spectral domain as depicted in the left part of FIG. 3.

Referring now specifically to the illustration made in FIG. 3, FIG. 3 represents an example of the bipartite created by through hashing for N=8, K=3 and C=2. The hashing matrices used $\Sigma_1$, $\Sigma_2$ are given on the right.

It may be observed in the figure that how sparse the underline bipartite graph becomes after applying of the hashing operation with B=4, and C=2 produced by plugging $\Sigma_1$, $\Sigma_2$ in equation (4). The variable nodes (●) are the non-zero coefficients to be recovered. The white check nodes (□) are the original time-domain samples. The gray scale colored squares are new check nodes after application of Algorithm 1. Each group of four check nodes corresponds to a different permutation. In the new graph, every check node uses log 2 N B+1 samples for collision detection and support estimation.

Over the induced bipartite graph on the spectral components, an iterative peeling algorithm is run, peeling algorithm that has been explained in detail earlier in this document and that will be summarized in the following. In order to perform a complexity analysis of the peeling algorithm, B is assumed to be the number of bins used for hashing the spectral components of x, where B=$2^b$ for some b∈ℕ, and C is the number of different hashing schemes used, where it is assumed that C=θ(1). In the resulting bipartite graph representation, C is the degree of every variable node (nonzero spectral component). The algorithm of the present invention is designed for the case K/B=θ(1). Using what we know regarding hashing, it is of note that the hashing operation has time complexity $O(B \log_2(B))$, which in this case is equivalent to $O(K \log_2(K))$. Moreover, using what is known above about collision detection support estimation to identify the collided spectral components requires $n-b=\log_2(N/B)=O(\log_2(N/K))$ extra hashes. Therefore, the complexity of creating the sparse graph is $O(K \log_2 K \log_2(N/K))$. The peeling algorithm runs in time linear in the number of variable nodes, but in the case summarized above needs an additional $\log_2(N/B)$ operations to decode the support of isolated check nodes. Running the peeling algorithm for a constant prefixed number of iterations is sufficient to recover the nonzero spectral values, thus the total time complexity of the algorithm is also of the order $O(K \log_2(K) \log_2(N/K))$ as it was already discussed earlier in this document.

The iterative peeling algorithm of the present invention first tests every check node until a degree one check node is identified. Such a check node is denominated as a singleton. By using collision detection/support estimation, the algorithm is able to find the position and the value of the corresponding nonzero component and to peel it off from all other check nodes. In particular, after this operation the corresponding singleton check node gets value zero, namely, it is satisfied. Such a check node is denominated a zeroton. If after a couple of iterations, all of the check nodes are zerotons, namely, all of them are satisfied, the algorithm of the present invention has been able to identify all of the non-zero spectral components. However, if during the algorithm no singleton exists to be peeled off, namely, all of the check nodes have degree greater than 1, the such check nodes are called multiton check nodes and the algorithm fails to identify all of the spectral coefficients. The efficiency of the proposed algorithm is measured by the probability of the success recovery.

A detailed pseudo-code of the proposed algorithm has been proposed in the above and it is repeated bellow:

```
SparseFHT(x, N, K, C, L, Σ)
Require: Input signal x of length N = 2^n. Sparsity K.
Oversampling C. Number of iterations of decoder L. Array Σ of
C matrices in
GL(n, F_2), Σ_c =|σ_{c,1}|...|σ_{c,n}|, σ_{c,i} ∈ F_2^n.
Ensure: X contains the sparse Hadamard spectrum of x.
B = O(k)
D = n - b + 1
for c = 1; ... C do
  U_{c,0} = FastHadamardHashing(x, N, Σ_c, 0, B)
  for d = 1, ..., D do
    U_{c,d} = FastHadamardHashing(x, N, Σ_c, σ_{c,d}, B)
  end for
end for
for l = 1, ... , L do
  for c = 1, ..., C do
    for k = 0, ..., B - 1 do
      if U_{c,O,k} = 0 then
        continue to next k
      end if
      v̂ ← 0
      for d = 1, ..., D do
        if U_{c,d,k}/U_{c,o,k} = -1 then
          v̂_{d-1} ← 1
        else if U_{c,d,k} / U_{c,o,k} ≠ 1 then
          continue to next k
        end if
      end for
      i ← Σ_c^{-T}(Ψ_b k + v̂)
      X_i ← U_{c,O,k}
      for c'=1,...,C do
```

-continued

```
        j ← Ψ_b^T Σ_{c'}^T i
        U'_{c',o,j} ← U'_{c',o,j} - X_i
        for d'=1, ..., D do
          U_{c',d',j} ← U_{c',d',j} - X_i(-1)^{<σ_{c',d',i}>}
        end for
      end for
    end for
  end for
end for
```

In accordance with another embodiment of the invention, a system for performing a determination of a Walsh-Hadamard transform of N samples of a signal is as well proposed. Said system comprises a plurality of modules, each module comprising a computer readable medium having thereon computer executable instructions for: electing a plurality of hashing C matrices $\Sigma_1, \ldots \Sigma_C$, computing C hashes of a particular length based at least on a hashing front end and said plurality of matrices $\Sigma_1, \ldots \Sigma_C$, forming a bipartite graph with a plurality of variable nodes and a plurality of check nodes, wherein said variable nodes are non-zero coefficients to recover, and said check nodes are hashed samples, finding an isolated check node and recovering non-zero coefficients connected to said isolated check node by employing collision detection and support estimation of said signal, peeling from said bipartite graph the recovered non-zero coefficients, and repeating said computing step, forming step, finding step and peeling step until all the nodes in said plurality of check nodes are zero.

In accordance with yet another embodiment of the invention, a computer readable storage medium having recorded thereon a computer program for determining a Walsh-Hadamard transform of N samples of a signal, is proposed. The computer program comprises an algorithm capable of electing a plurality of hashing C matrices $\Sigma_1, \ldots \Sigma_C$, computing C hashes of a particular length based at least on a hashing front end and said plurality of matrices $\Sigma_1, \ldots \Sigma_C$, forming a bipartite graph with a plurality of variable nodes and a plurality of check nodes, wherein said variable nodes are non-zero coefficients to recover, and said check nodes are hashed samples, finding an isolated check node and recovering non-zero coefficients connected to said isolated check node by employing collision detection and support estimation of said signal, peeling from said bipartite graph the recovered non-zero coefficients, and repeating said computing step, forming step, finding step and peeling step until all the nodes in said plurality of check nodes are zero.

Figure 5:
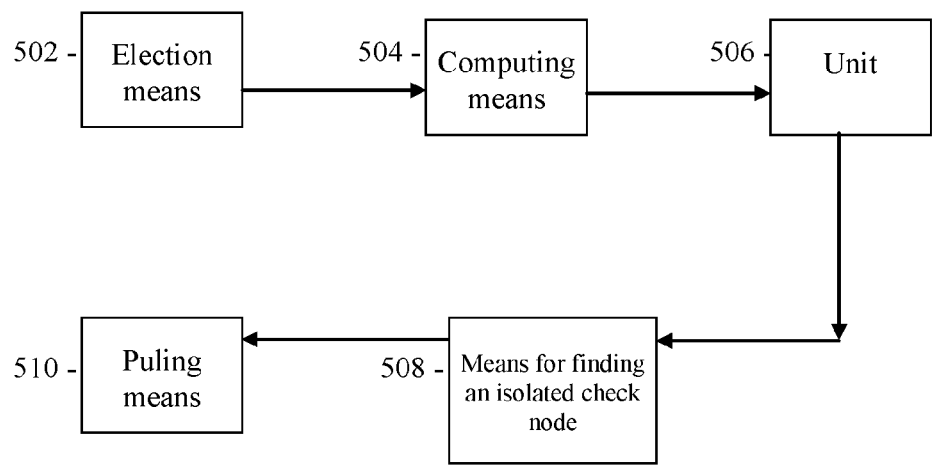
FIG. 5 represents an exemplary embodiment of an apparatus proposed in accordance with the present invention.

In accordance with a further another embodiment of the invention, an apparatus for determining a Walsh-Hadamard transform of N samples of a signal has been proposed. Such an apparatus is represented via block representation in FIG. 5. The apparatus 500 comprises an election means 502 for electing a plurality of hashing C matrices $\Sigma_1, \ldots \Sigma_C$, computing means 504 capable of computing C hashes of a particular length based at least on a hashing front end and said plurality of matrices $\Sigma_1, \ldots \Sigma_C$, a unit 506 capable of forming a bipartite graph with a plurality of variable nodes and a plurality of check nodes, the variable nodes being non-zero coefficients to recover, and the check nodes being hashed samples, means 508 for finding an isolated check node and recovering non-zero coefficients connected to said isolated check node by employing collision detection and support estimation of said signal, and peeling means 510 for peeling from said bipartite graph the recovered non-zero coefficients.

The means of the present invention may be implemented as software means, hardware means or a combination thereof The systems and methods described above can be embodied, for example, in a wireless modem or wireless device integrating such a modem.

It is to be recognized that depending on the embodiment, certain acts or events of any of the methods described herein can be performed in a different sequence, may be added, merged, or left out all together (e.g., not all described acts or events are necessary for the practice of the method). Moreover, in certain embodiments, acts or events may be performed concurrently, e.g., through multi-threaded processing, interrupt processing, or multiple processors, rather than sequentially.

Those of skill will recognize that the various illustrative logical blocks, modules, circuits, and algorithm steps described in connection with the methods, systems, and apparatuses disclosed herein may be implemented as electronic hardware, computer software executed by a processor, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Moreover, embodiments disclosed herein may be implemented or performed with an electronic device or circuit such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

Specifically, in accordance with an embodiment of the present invention, an apparatus for an apparatus for determining a Walsh-Hadamard transform of N samples of a signal, comprises election means for electing a plurality of hashing C matrices $\Sigma_1, \ldots \Sigma_C$, computing means capable of computing C hashes of a particular length based at least on a hashing front end and said plurality of matrices $\Sigma_1, \ldots \Sigma_C$, a unit capable of forming a bipartite graph with a plurality of variable nodes and a plurality of check nodes, wherein said variable nodes are non-zero coefficients to recover, and said check nodes are hashed samples, means for finding an isolated check node and recovering non-zero coefficients connected to said isolated check node by employing collision detection and support estimation of said signal, and peeling means for peeling from said bipartite graph the recovered non-zero coefficients.

In accordance with the present invention, the apparatus further comprises means for exploiting an priori known K sparsity in a domain of the transform, means for subsampling the signal to create controlled interferences in a domain of the transform.

Various examples have been described. These and other examples are within the scope of the following claims.

What is claimed is:

1. A method for determining the Walsh-Hadamard transform of N samples of a CDMA signal, in order to separate users of the CDMA signal,
   wherein said signal comprises N samples,
   comprising:
   electing, by election means, a plurality of hashing C matrices $\Sigma_1, \ldots \Sigma_C$;
   computing, by computing means, C hashes of a particular length based at least on a hashing front end and said plurality of matrices $\Sigma_1, \ldots \Sigma_C$;
   forming, by a forming unit, a bipartite graph with a plurality of variable nodes and a plurality of check nodes,
   wherein said variable nodes are non-zero coefficients to recover, and said check nodes are hashed samples;
   finding, by a node finding unit, an isolated check node and recovering non-zero coefficients connected to said isolated check node;
   peeling, by peeling means, from said bipartite graph the recovered non-zero coefficients to determine the Walsh-Hadamard transform and to separate said users,
   wherein said election means, computing means, forming unit, node finding unit and peeling means are implemented by a general purpose processor, a digital signal processor, an application specific integrated circuit, a field programmable gate array or other programmable logic device, discrete gate or transistor logic, discrete hardware components, or any combination thereof.

2. The method of claim 1, further comprising the step of exploiting an a priori known K sparsity in a domain of said transform.

3. The method of claim 1, further comprising subsampling the signal to create controlled interferences in a domain of said transform.

4. The method of claim 1, wherein said C hashes are selected as functions depending on a priori known non uniformity of the signal to transform.

5. The method of claim 1, wherein a number of non-zero variables in each check node of said bipartite graph is at least two due to the sparsity in the transformed domain.

6. The method of claim 1, wherein said variable nodes being non-zero coefficients to recover such as spectral components, and the check nodes being hashed samples such as an inner product of the i-th row of a hashed sample.

7. An apparatus used in the domain of spread spectrum communications in order to separate users of a shared medium, comprising:

a processing device configured to elect a plurality of hashing C matrices $\Sigma_1, \ldots \Sigma_C$;

the processing device further configured to compute C hashes of a particular length based at least on a hashing front end and said plurality of matrices $\Sigma_1, \ldots \Sigma_C$;

a unit configured to form a bipartite graph with a plurality of variable nodes and a plurality of check nodes, wherein said variable nodes are non-zero coefficients to recover, and said check nodes are hashed samples of a signal;

the processing device further configured to find an isolated check node and recover non-zero coefficients connected to said isolated check node by employing collision detection and support estimation of said signal; and the processing device further configured to peel from said bipartite graph the recovered non-zero coefficients, in order to determine a Walsh Hadamard transform of said samples and to determine the signals corresponding to each user.

8. The apparatus of claim 7, said processing device further configured to exploit an a priori known K sparsity in a domain of said transform.

9. The apparatus of claim 7, said processing device further configured to subsample the signal to create controlled interferences in a domain of said transform.

10. The apparatus of claim 8, wherein said C hashes are selected as functions depending on a priori known non uniformity of the signal to transform.

11. The apparatus of claim 10, wherein a number of non-zero variables in each check node of said bipartite graph is at least two due to the sparsity in the transformed domain.

12. The apparatus of claim 11, wherein said variable nodes being non-zero coefficients to recover such as spectral components, and the check nodes being hashed samples such as an inner product of the i-th row of a hashed sample.

13. A method, comprising:

providing a spectroscopy signal comprising N samples, determining a Walsh-Hadamard transform of said signal, the determining step comprising:

electing, by election means, a plurality of hashing C matrices $\Sigma_1, \ldots \Sigma_C$;

computing, by computing means, C hashes of a particular length based at least on a hashing front end and said plurality of matrices $\Sigma_1, \ldots \Sigma_C$;

forming, by a forming unit, a bipartite graph with a plurality of variable nodes and a plurality of check nodes, wherein said variable nodes are non-zero coefficients to recover, and said check nodes are hashed samples;

finding, by a node finding unit, an isolated check node and recovering non-zero coefficients connected to said isolated check node;

peeling, by peeling means, from said bipartite graph the recovered non-zero coefficients, wherein said election means, computing means, forming unit, node finding unit and peeling means are implemented by a general purpose processor, a digital signal processor, an application specific integrated circuit, a field programmable gate array or other programmable logic device, discrete gate or transistor logic, discrete hardware components, or any combination thereof.

* * * * *